(12) United States Patent
Miller et al.

(10) Patent No.: US 9,279,944 B1
(45) Date of Patent: Mar. 8, 2016

(54) COMMUNICATION CONNECTORS HAVING TETHERED PROTECTIVE CAPS

(71) Applicant: Tyco Electronics Corporation, Berwyn, PA (US)

(72) Inventors: Stephen James Miller, Dauphin, PA (US); Daniel Erlin Wertman, Mechanicsburg, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 0 days.

(21) Appl. No.: 14/550,616

(22) Filed: Nov. 21, 2014

(51) Int. Cl.
*G02B 6/36* (2006.01)
*G02B 6/38* (2006.01)
*H01R 13/639* (2006.01)
*H01R 4/22* (2006.01)

(52) U.S. Cl.
CPC ............ *G02B 6/3849* (2013.01); *G02B 6/3894* (2013.01); *G02B 6/3897* (2013.01); *H01R 4/22* (2013.01); *H01R 13/639* (2013.01)

(58) Field of Classification Search
CPC .. G02B 6/3887; G02B 6/3869; G02B 6/3893; G02B 6/3821; G02B 6/3825; G02B 6/36
USPC .................. 385/53, 76, 86, 87, 88, 90, 91, 92
See application file for complete search history.

(56) References Cited

U.S. PATENT DOCUMENTS 7,460,750 B2 * 12/2008 Durrant .................... G02B 6/32
385/35
7,591,595 B2 * 9/2009 Lu ......................... G02B 6/3816
385/60

* cited by examiner

*Primary Examiner* — Jennifer Doan (57) ABSTRACT

A communication connector includes a housing having a panel flange configured to abut against a rear of a panel and a mating end configured to be positioned forward of the panel. The housing has panel nut threads and a panel nut is threadably coupled thereto. The panel nut has a tether extending therefrom with a first tether loop secured to the panel nut and a second tether loop at a second end. A protective cap is removably coupled to the mating end of the housing. The protective cap has a lanyard extending therefrom having a first lanyard loop removably coupled to the second tether loop. When the protective cap is coupled to the mating end, access to the at least one conductor is restricted, and when the protective cap is removed from the mating end, access to the at least one conductor is allowed.

20 Claims, 5 Drawing Sheets

COMMUNICATION CONNECTORS HAVING TETHERED PROTECTIVE CAPS

BACKGROUND OF THE INVENTION

The subject matter herein relates generally to communication connectors having tethered protective caps.

Some known communication connectors provide a protective cap for the mating end of the connector. The protective cap is used when the communication connector is not in use. However, when a mating connector is ready for connection, the protective cap may be removed to provide access to the communication connector. The protective caps can be easily misplaced or lost when not attached to the communication connector. Also, having loose pieces around the equipment having the communication connectors may be undesirable.

Accordingly, at least some known systems use tethers to secure the protective cap to the communication connector or the equipment so the protective cap remains in position for use after the mating connector is unmated. However, known tethers are not without disadvantages. For instance, the tethers provide a fixed connection between the protective cap and the communication connector. At times, there is a need to remove the protective cap entirely, such as when the protective cap is damaged and needs to be replaced. Removal of such protective caps requires special tools and loose pieces may result when the tether is removed.

BRIEF DESCRIPTION OF THE INVENTION

In one embodiment, a communication connector is provided that includes a housing holding at least one conductor configured to be mounted to a panel. The housing has a panel flange configured to abut against a rear of the panel and a mating end configured to be positioned forward of the panel. The housing has panel nut threads configured to be positioned forward of the panel. A panel nut is threadably coupled to the panel nut threads. The panel nut has a panel nut flange configured to abut against a front of the panel such that the panel is captured between the panel nut flange and the panel flange of the housing. The panel nut has a tether extending therefrom having a first tether loop at a first end looped around and secured to the panel nut and having a second tether loop at a second end. A protective cap is removably coupled to the mating end of the housing. The protective cap has a lanyard extending therefrom having a first lanyard loop at a distal end thereof configured to be removably coupled to the second tether loop. When the protective cap is coupled to the mating end, access to the at least one conductor is restricted, and when the protective cap is removed from the mating end, access to the at least one conductor is allowed.

In another embodiment, a communication connector is provided having a housing holding at least one conductor and configured to be mounted to a panel. The housing has a panel flange configured to abut against a rear of the panel. The housing has a mating end configured to be positioned forward of the panel. The housing has panel nut threads configured to be positioned forward of the panel. A panel nut is threadably coupled to the panel nut threads. The panel nut has a panel nut flange configured to abut against a front of the panel such that the panel is captured between the panel nut flange and the panel flange of the housing. The panel nut has a tether extending therefrom. The tether has a first tether loop at a first end looped around and secured to the panel nut and a second tether loop at a second end. The first and second tether loops have fixed arc lengths. A protective cap is removably coupled to the mating end of the housing. The protective cap has a lanyard extending therefrom having a first lanyard loop at a distal end thereof. The first lanyard loop has a fixed arc length. The first lanyard loop is removably coupled to the second tether loop. When the protective cap is coupled to the mating end, access to the at least one conductor is restricted, and when the protective cap is removed from the mating end, access to the at least one conductor is allowed. An arc length of the second tether loop is greater than a size of the protective cap such that the protective cap is able to pass through the second tether loop. An arc length of the first lanyard loop is large enough to allow the second lanyard loop to pass therethrough. The lanyard is secured to the tether by passing the second tether loop through the first lanyard loop and then passing the protective cap through the second tether loop.

DETAILED DESCRIPTION OF THE INVENTION

Figure 1:
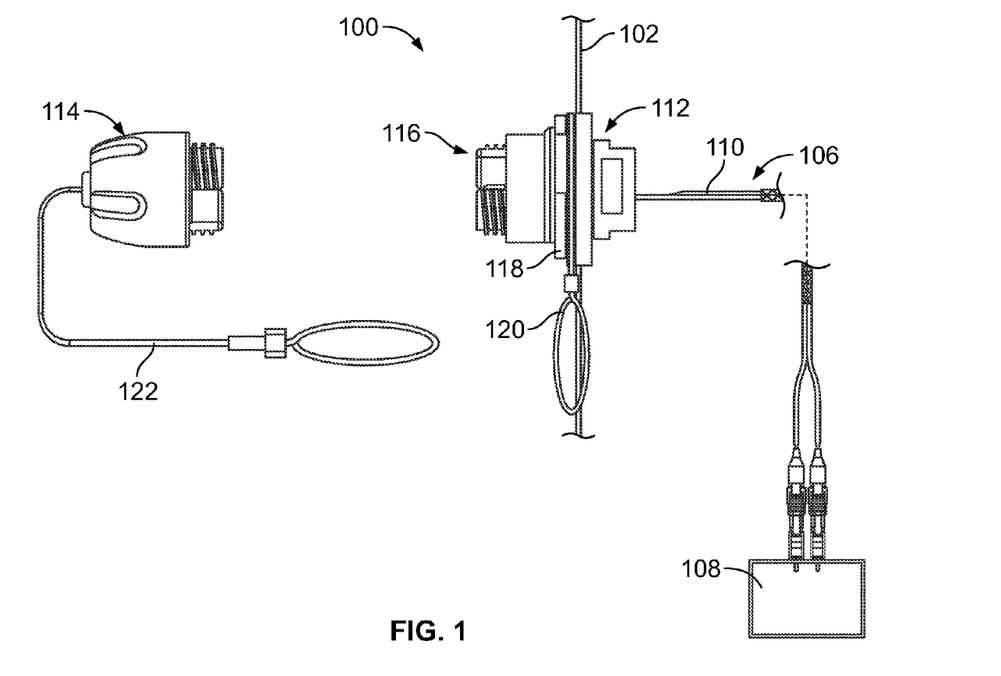
FIG. 1 is illustrates a communication connector formed in accordance with an exemplary embodiment.
Figure 2:
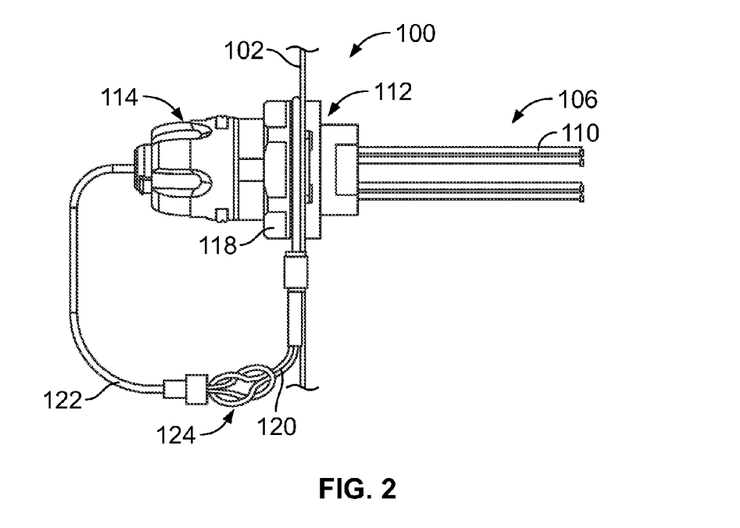
FIG. 2 illustrates the communication connector in an assembled state.

FIG. 1 illustrates a communication connector 100 formed in accordance with an exemplary embodiment. FIG. 2 illustrates the communication connector 100 in an assembled state. The communication connector 100 may be a panel mounted connector, such as a bulkhead connector, in various embodiments, which is configured to be mounted to a panel 102. The communication connector 100 may be a fiber optic connector, an electrical connector or another type of communication connector. The communication connector 100 may transmit data signals, such as optical signal, electrical signals, and the like and may transmit power. The communication connector 100 extends through a panel opening 104 (shown in FIG. 5) in the panel 102 to create an exterior mating interface for a mating connector (not shown). Conductors 106 extend from the communication connector 100 to another electrical component 108 interior of or behind the panel 102. In the illustrated embodiment, the conductors 106 include cables 110 extending from the communication connector 100 to the electrical component 108. The cables 110 may be fiber-optic cables in various embodiments; however, other types of cables may be used in alternative embodiments such as electrical cables.

In an exemplary embodiment, the communication connector 100 includes a housing 112 that is mounted to the panel 102. The communication connector 100 includes a protective cap 114 that is removably coupled to a mating end 116 of the housing 112. When the protective cap 114 is coupled to the mating end 116, access to the conductors 106 of the communication connector 100 is restricted. When the protective cap 114 is removed from the mating end 116, access to the conductors 106 of the communication connector 100 is allowed. For example, the mating connector may be mated to the mating end 116 of the communication connector 100 after the protective cap 114 is removed.

In an exemplary embodiment, the communication connector 100 includes a panel nut 118 that is used to secure the communication connector 100 to the panel 102. For example, the panel nut 118 may be threadably coupled to the housing 112 such that the panel 102 is captured between the housing 112 and the panel nut 118.

In an exemplary embodiment, the protective cap 114 is tethered to the communication connector 100 to avoid loose components which could fall off and be lost during disconnection. The communication connector 100 includes a tether 120 secured to the panel nut 118 and/or the housing 112. The tether 120 dangles from the communication connector 100. The protective cap 114 includes a lanyard 122 extending therefrom. The lanyard 122 in configured to be removably coupled to the tether 120. As such, the protective cap 114 may be removed from the communication connector 100 without removing the tether 120 from the panel nut 118.

The lanyard 122 allows the protective cap 114 to be detachable from the tether 120. The lanyard 122 allows the protective cap 114 to be easily removed from the tether 120 without extra tooling or spare parts. Once removed, the protective cap 114 and lanyard 122 can be easily reattached without tooling or the use of extra components.

In an exemplary embodiment, the lanyard 122 may be secured to the tether 120 at a knot 124. When the knot 124 is tightened, the lanyard 122 may not be detached from the tether 120 without untightening the knot 124. A secure and reliable connection is made between the lanyard 122 and the tether 120; however such secure connection is capable of being undone without the use of extra tooling or spare parts.

Figure 3:
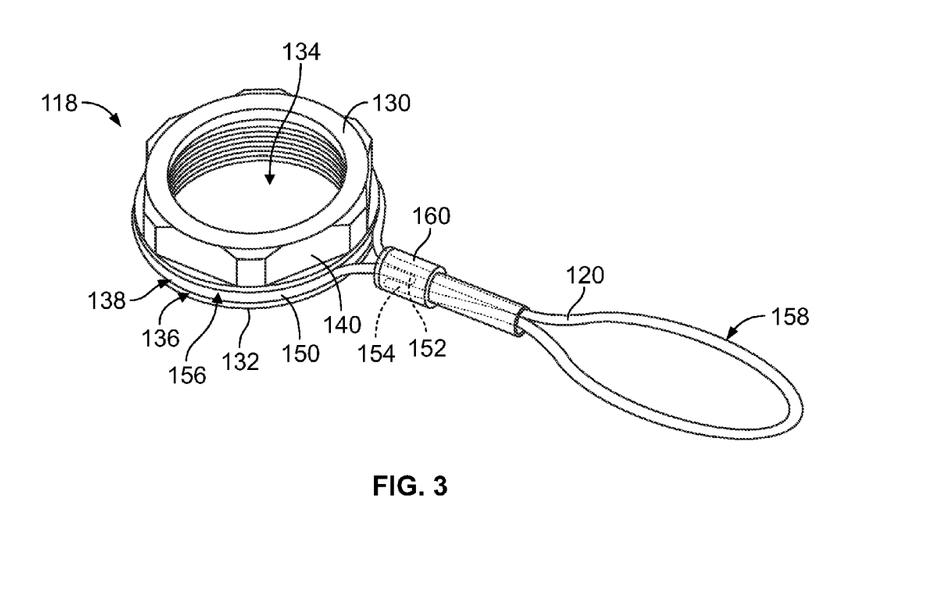
FIG. 3 illustrates a panel nut of the communication connector with an exemplary tether secured thereto.

FIG. 3 illustrates the panel nut 118 with the tether 120 secured thereto. The panel nut 118 is ring shaped and extends between a front 130 and a rear 132. The panel nut 118 has a panel nut opening 134 extending therethrough. In an exemplary embodiment, the panel nut opening 134 is threaded.

The panel nut 118 includes a panel nut flange 136 at the rear 132. In the illustrated embodiment, the tether 120 is secured to the panel nut flange 136; however the tether 120 may be secured to other portions of the panel nut 118. The tether 120 is received in a circumferential tether groove 138 in the exterior of the panel nut flange 136. The tether groove 138 holds the axial position of the tether 120 with respect to the panel nut 118. In an exemplary embodiment, the panel nut 118 includes a plurality of flats 140 along the exterior for hand tightening or that may be engaged by a wrench or other tightening tool for tightening the panel nut 118 to the housing 112 (shown in FIG. 1).

The tether 120 includes a cord 150 having a first end 152 and a second end 154. The cord 150 is looped at the first end 152 to form a first tether loop 156. The cord 150 is looped at the second end 154 to form a second tether loop 158. The first end 152 is secured to an intermediate segment of the cord 150 by a fixing mechanism 160. The second end 154 is secured to an intermediate segment of the cord 150 using the fixing mechanism 160. In the illustrated embodiment, the fixing mechanism 160 is a crimp; however, other types of fixing mechanisms may be used in alternative embodiments. Optionally, both the first and second ends 152, 154 may be secured using a single fixing mechanism 160. Alternatively, the first end 152 may be secured with a first fixing mechanism and the second end 154 may be secured with a second fixing mechanism remote from the first fixing mechanism.

The first tether loop 156 receives the panel nut 118. For example, the cord 150 defining the first tether loop 156 is positioned in the tether groove 138. The first tether loop 156 has a first arc length, which may be defined as the distance of the cord 150 between the two segments of the first tether loop 156 enter the fixing mechanism 160. The first arc length may be approximately equal to the diameter of the tether groove 138.

The second tether loop 158 has a second arc length, which may be defined as the distance of the cord 150 between the two segments defining the second tether loop 158 enter the fixing mechanism 160. The second arc length may be sufficiently large enough to allow the protective cap 114 (shown in FIG. 1) to pass therethrough, such as to allow tying and untying of the knot 124 (shown in FIG. 1).

Figure 4:
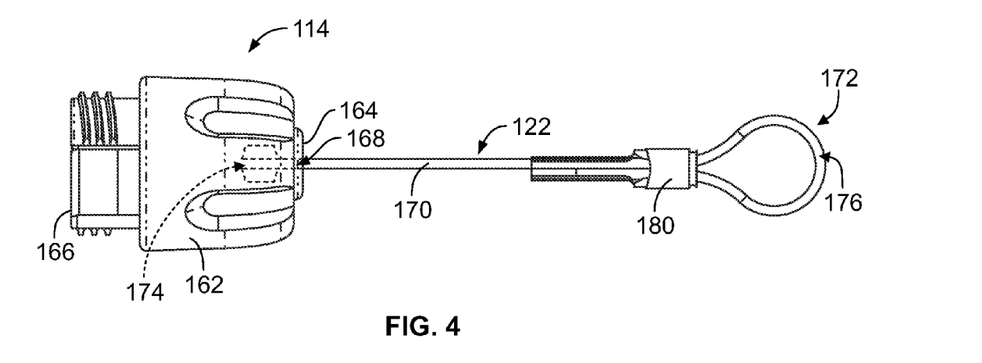
FIG. 4 illustrates a protective cap of the communication connector with an exemplary lanyard secured thereto.

FIG. 4 illustrates the protective cap 114 and lanyard 122. The protective cap 114 includes a body 162 extending between a front 164 and rear 166. The rear 166 is configured to be coupled to the housing 112 (shown in FIG. 1). Optionally, the protective cap 114 may be threadably coupled to the housing 112. Alternatively, the protective cap 114 may be press fit onto the housing 112. The protective cap 114 includes a front opening 168 at the front 164. The lanyard 122 extends through the front opening 168. The lanyard 122 is secured to the body 162 interior of the protective cap 114. A portion of the lanyard 122 is located exterior of the protective cap 114 for coupling to the tether 120 (shown in FIG. 3).

The lanyard 122 includes a cord 170 having a first end 172 and a second end 174. The cord 170 is looped at the first end 172 to form a first lanyard loop 176. The second end 174 is secured to the protective cap 114. The first end 172 is secured to an intermediate segment of the cord 170 by a fixing mechanism 180. In the illustrated embodiment, the fixing mechanism 180 is a crimp; however, other types of fixing mechanisms may be used in alternative embodiments.

Figure 5:
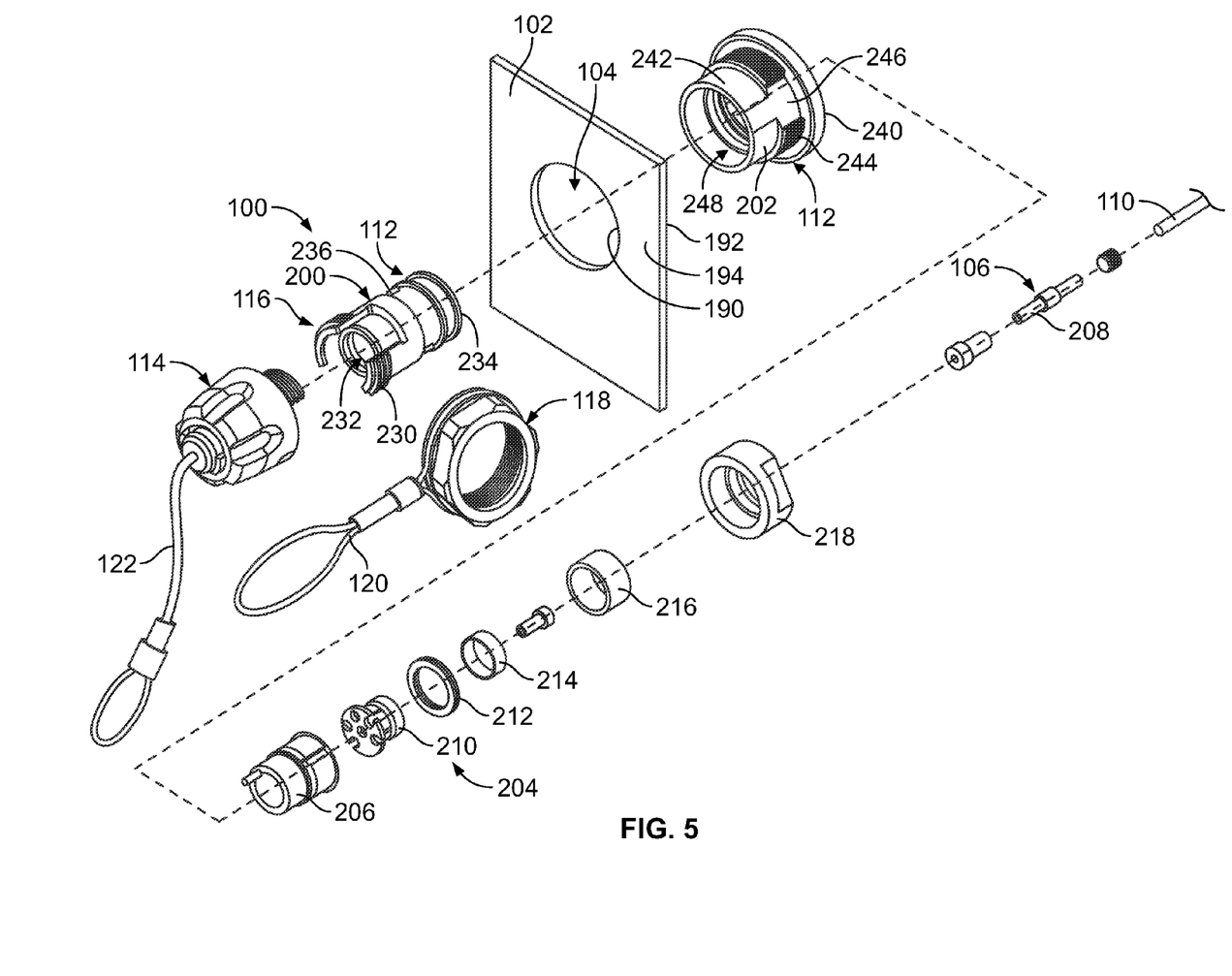
FIG. 5 is an exploded view of a communication connector in accordance with an exemplary embodiment.

FIG. 5 is an exploded view of the communication connector 100 in accordance with an exemplary embodiment. The embodiment illustrated in FIG. 5 is a particular type of fiber-optic connector; however, is realized that the lanyard and tether protective cap securing features may be used with other types of communication connectors in alternative embodiments. For example, other types of fiber-optic connectors or communication connectors may be used in alternative embodiments.

FIG. 5 illustrates the panel 102 and panel opening 104. The various components of the communication connector 100 may be coupled to the panel 102 and received in the panel opening 104. In the illustrated embodiment, the panel opening 104 is a D-shaped opening having a flat 190 along one side thereof. The D-shaped opening 104 having the flat 190 may be used to hold the communication connector 100 in a particular orientation and to resist rotation of the communication connector 100 within the panel opening 104. The panel opening 104 may have other shapes in alternative embodiments, such as a round shape, a rectangular shape, an oval shape, and the like.

In the illustrated embodiment, the housing 112 is a two piece housing having a front housing 200 and a rear housing 202. The rear housing 202 is configured to be plugged into the panel opening 104 from behind the panel 102 and abut against a rear 192 of the panel 102. The front housing 200 may be loaded into the rear housing 202, such as from a front 194 of the panel 102. The front housing 200 may extend forward of the front 194 of the panel 102. Optionally, at least a portion of the rear housing 202 may extend forward of the front 194 of the panel 102. The panel nut 118 may be similarly coupled to the rear housing 202 from the front 194 of the panel 102. The panel nut 118 may be threadably coupled to the rear housing 202 such that the panel 102 is captured between the panel nut 118 and the rear housing 202. For example, the panel nut 118 may abut against the front 194 of the panel 102 while the rear housing 202 may abut against the rear 192 of the panel 102.

The communication connector 100 includes an insert assembly 204 that is configured to be loaded into the front housing 200 and/or the rear housing 202. The insert assembly 204 includes one or more of the conductors 106 which are held in an insert assembly housing 206. In the illustrated embodiment, the conductor 106 is a fiber-optic conductor having a ferrule 208 provided at an end of the cable 110 of the conductor 106. The ferrule 208 is configured to be loaded into and held within the insert assembly housing 206. The insert assembly 204 includes a crimp base 210 to hold the ferrules 208 in the insert assembly housing 206. A wave spring 212 may be received over a rear end of the crimp base 210. A crimp ring 214 may also be received over the rear end of the crimp base 210 to crimp portions of the cables 110 to the insert assembly 204. The insert assembly 204 may include a compression ring 216 and locking nut 218 to secure the insert assembly 204 to the front housing 200.

The front housing 200 defines the mating end 116 of the housing 112. Optionally, the mating end 116 may include mating threads 230 at the mating end 116. The front housing 200 includes a cavity 232 that extends from the mating end 116 to a rear end 234. The cavity 232 is sized and shaped to receive the insert assembly 204. Optionally, the front housing 200 may include keying features 236 along an exterior thereof. The keying features 236 may be used to orient the front housing 200 relative to the rear housing 202.

The rear housing 202 includes a panel flange 240 at a rear of the rear housing 202. A boss 242 extends forward of the panel flange 240. In an exemplary embodiment, at least a portion of the boss 242 includes panel nut threads 244 used to secure the panel nut 118 to the rear housing 202. The rear housing 202 includes a flat 246 along an exterior thereof. The flat 246 is configured to be aligned with the flat 190 of the panel opening 104 to align the rear housing 202 with the panel opening 104 and to resist rotation of the rear housing 202 relative to the panel 102. The rear housing 202 includes a cavity that extends between a front and a rear of the rear housing 202. The front housing 200 is received in the cavity 248 of the rear housing 202.

Figure 6:
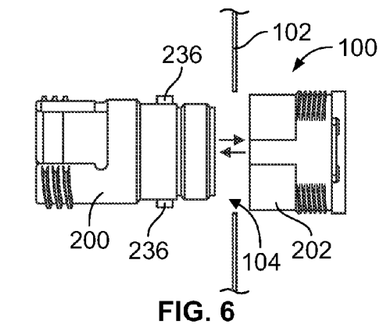
FIG. 6 illustrates the communication connector being assembled to a panel.

FIG. 6 illustrates the communication connector 100 being assembled to the panel 102. During assembly, the rear housing 202 is loaded in the panel opening 104 from behind the panel 102. The front housing 200 is configured to be loaded into the rear housing 202 from the front of the panel 102. Optionally, the front housing 200 may be pre-loaded into the rear housing 202 prior to the rear housing 202 being positioned in the panel opening 104. The keying features 236 on the front housing 200 may orient the front housing 200 relative to the rear housing 202.

Figure 7:
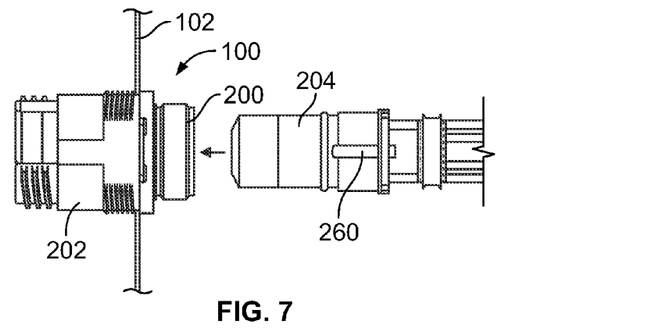
FIG. 7 illustrates the communication connector during assembly.

FIG. 7 illustrates the communication connector 100 during assembly. During assembly, the insert assembly 204 is loaded into the front housing 200 from behind the panel 102. Optionally, the insert assembly 204 may be pre-loaded into the front housing 200 prior to the front housing 200 being loaded in the rear housing 202 and/or prior to the rear housing 202 being positioned in the panel opening 104. The insert assembly 204 may include a keying feature 260 used to orient the insert assembly 204 relative to the front housing 200.

Figure 8:
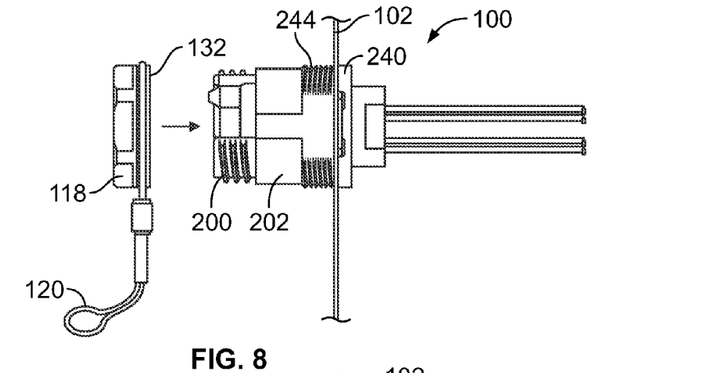
FIG. 8 illustrates the communication connector during assembly.

FIG. 8 illustrates the communication connector 100 during assembly. During assembly, the locking nut 218 is used to lock the insert assembly 204 (shown in FIG. 7) in the front housing 200. The locking nut 218 may also lock the front housing 200 to the rear housing 202.

During assembly, the panel nut 118 is used to lock the communication connector 100 to the panel 102. The panel nut 118 is configured to be threadably coupled to the panel nut threads 244 on the rear housing 202. As the panel nut 118 is tightened to the rear housing 202, the panel 102 is captured between the rear 132 of the panel nut 118 and the panel flange 240. The panel nut 118 may be tightened with a wrench or other tool. Optionally, the panel nut 118 may be hand tightened. The tether 120 is freely rotatable about the panel nut 118 such that the tether 120 may dangle from the panel nut 118 for connection of the protective cap 114 (shown in FIG. 1) to the communication connector 100.

Figure 9:
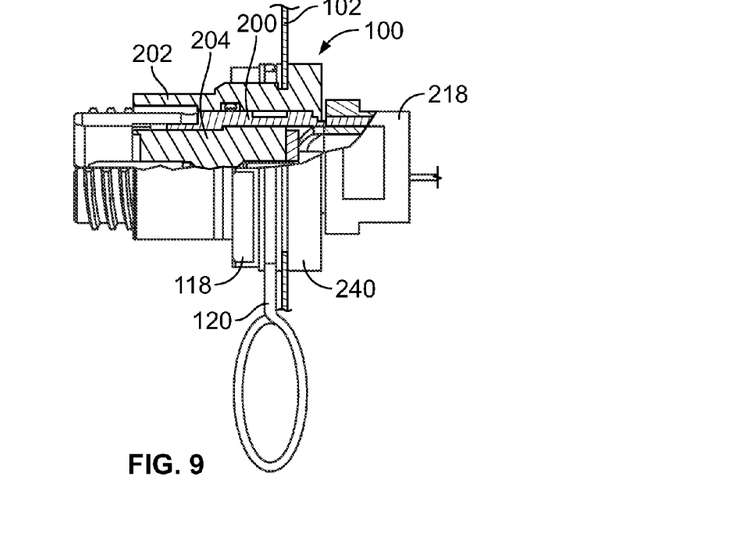
FIG. 9 is cross sectional view of a portion of the communication connector mounted to the panel.

FIG. 9 is cross sectional view of a portion of the communication connector 100 mounted to the panel 102. The panel 102 is captured between the panel nut 118 and the panel flange 240. The insert assembly 204 is received within the front housing 200. The locking nut 218 holds the insert assembly 204 in the front housing 200. The locking nut 218 also holds the front housing 200 in the rear housing 202. The tether 120 hangs from the panel nut 118 for connection of the protective cap 114 (shown in FIG. 1) to the communication connector 100.

Figure 10:
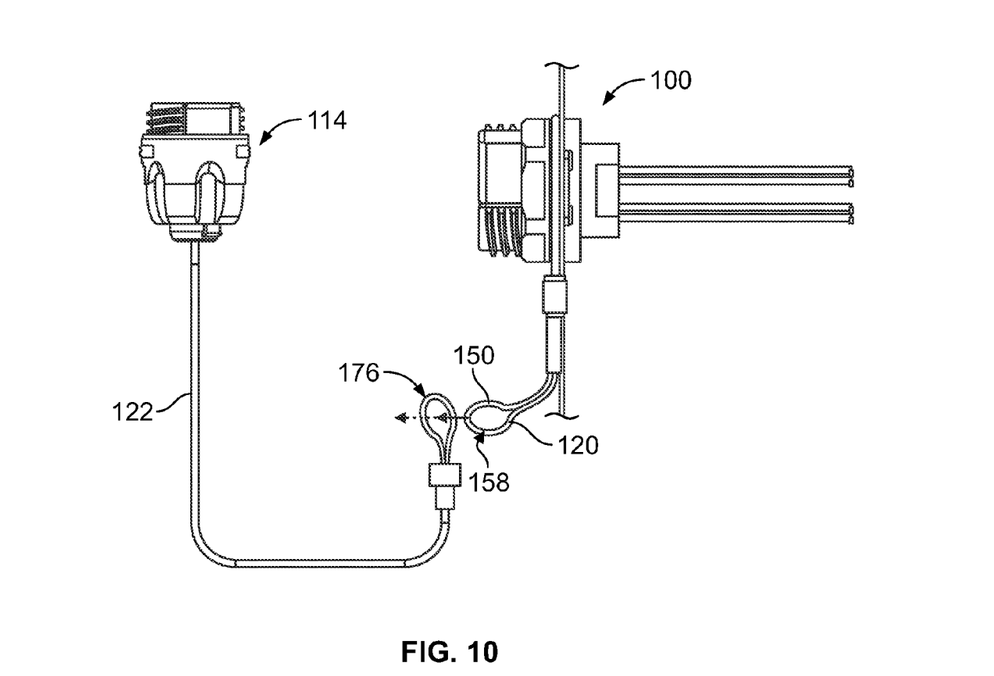
FIG. 10 shows the protective cap being coupled to the communication connector.
Figure 11:
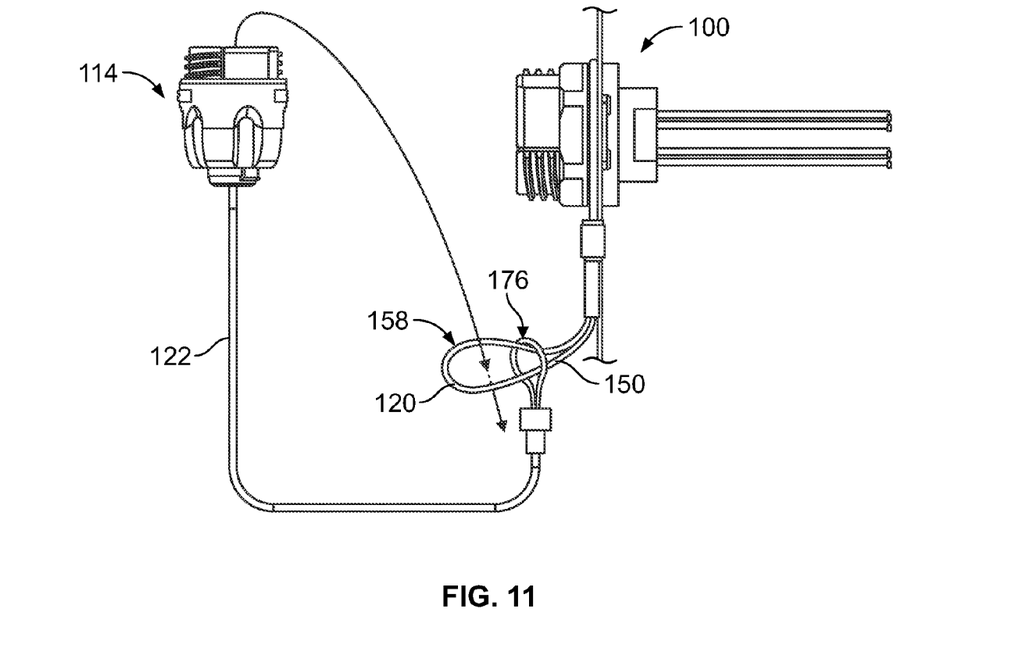
FIG. 11 shows the protective cap being coupled to the communication connector.

FIG. 10 shows the protective cap 114 being coupled to the communication connector 100. FIG. 11 shows the protective cap 114 being coupled to the communication connector 100. During assembly, the lanyard 122 is secured to the tether 120 with a detachable connection. The second tether loop 158 of the tether 120 passes through the first lanyard loop 176 (FIG. 10). The first lanyard loop 176 has an arc length sufficient to create an opening large enough to allow the second tether loop 158 to pass therethrough. The cord 150 is flexible and may be manipulated to be fed through the first lanyard loop 176.

Once the second tether loop 158 passes through the first lanyard loop 176 a downstream portion of the second tether loop 158 is opened up a sufficient amount to allow the protective cap 114 to pass through the downstream portion of the second tether loop 158. The arc length of the second tether loop 158 is sufficiently large enough to allow the protective cap 114 to be fed therethrough.

After the protective cap 114 is fed through the second tether loop 158 the lanyard 122 may be pulled tightly to form the knot 124 (shown in FIG. 2). Pulling on the lanyard 122 tightens the first lanyard loop 176 around the tether 120. Similarly, pulling on the tether 120 tightens the second tether loop 158 around the lanyard 122.

The protective cap 114 may be detached or removed from the tether 120 by loosening the knot 124 to expose a portion of the second tether loop 158 and passing the protective cap 114 back through the second tether loop 158. The lanyard 122 may then be removed from the tether 120.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

What is claimed is:

1. A communication connector comprising:
   a housing holding at least one conductor, the housing configured to be mounted to a panel, the housing having a panel flange configured to abut against a rear of the panel, the housing having a mating end configured to be positioned forward of the panel, the housing having panel nut threads configured to be positioned forward of the panel;
   a panel nut threadably coupled to the panel nut threads, the panel nut having a panel nut flange configured to abut against a front of the panel such that the panel is captured between the panel nut flange and the panel flange of the housing, the panel nut having a tether extending therefrom, the tether having a first tether loop at a first end looped around and secured to the panel nut, the tether having a second tether loop at a second end; and
   a protective cap removably coupled to the mating end of the housing, the protective cap having a lanyard extending therefrom, the lanyard having a first lanyard loop at a distal end thereof, the first lanyard loop being removably coupled to the second tether loop, wherein, when the protective cap is coupled to the mating end, access to the at least one conductor is restricted, and when the protective cap is removed from the mating end, access to the at least one conductor is allowed.

2. The communication connector of claim 1, wherein the lanyard has cord with a first end and a second end, the second end being secured to the protective cap, the first end being looped to form the first lanyard loop, the first end being fixed to the cord by a fixing mechanism to fix an arc length of the first lanyard loop.

3. The communication connector of claim 2, wherein the fixing mechanism is a crimp.

4. The communication connector of claim 1, wherein the tether has a cord with a first end looped to form the first tether loop and the second end looped to form the second tether loop, the second end being fixed to the cord by a fixing mechanism to fix an arc length of the second tether loop.

5. The communication connector of claim 4, wherein the first end is fixed to the cord by a fixing mechanism to fix an arc length of the first tether loop.

6. The communication connector of claim 1, wherein the lanyard passes through the second tether loop and wherein the tether passes through the first lanyard loop.

7. The communication connector of claim 1, wherein pulling on the lanyard tightens the first lanyard loop around the tether and pulling on the tether tightens the second tether loop around the lanyard.

8. The communication connector of claim 1, wherein the protective cap is removed from the tether by passing the protective cap back through the second tether loop.

9. The communication connector of claim 1, wherein the protective cap includes a body having a front with a front opening, the lanyard extending through the front opening and being secured to the body interior of the protective cap, the first lanyard loop being located exterior of the protective cap.

10. The communication connector of claim 1, wherein the protective cap is rotatably coupled to the housing at the mating end, the protective cap being freely rotatable relative to the lanyard.

11. The communication connector of claim 1, wherein the housing includes a tether groove, the first tether loop being received in the tether groove to hold an axial position of the tether with respect to the housing.

12. The communication connector of claim 1, wherein the housing includes a cavity, the at least one conductor being held by an inset assembly housing and having cables extending from the insert assembly housing, the insert assembly housing being loaded into the cavity of the housing.

13. The communication connector of claim 1, wherein the at least one conductor comprises a fiber-optic conductor comprising a ferrule.

14. The communication connector of claim 1, wherein the at least one conductor comprises an electrical contact.

15. The communication connector of claim 1, wherein the housing comprises a front housing having the mating end and a rear housing comprising the panel flange, the front housing being coupled to the rear housing.

16. The communication connector of claim 1, wherein the housing comprises a flat edge configured to be positioned in a panel opening in the panel to resist rotation of the housing with respect to the opening.

17. A communication connector comprising:
    a housing holding at least one conductor, the housing configured to be mounted to a panel, the housing having a panel flange configured to abut against a rear of the panel, the housing having a mating end configured to be positioned forward of the panel, the housing having panel nut threads configured to be positioned forward of the panel;
    a panel nut threadably coupled to the panel nut threads, the panel nut having a panel nut flange configured to abut against a front of the panel such that the panel is captured between the panel nut flange and the panel flange of the housing, the panel nut having a tether extending therefrom, the tether having a first tether loop at a first end looped around and secured to the panel nut, the tether having a second tether loop at a second end, the first and second tether loops having fixed arc length; and
    a protective cap removably coupled to the mating end of the housing, the protective cap having a lanyard extending therefrom, the lanyard having a first lanyard loop at a distal end thereof, the first lanyard loop having a fixed arc length, the first lanyard loop being removably coupled to the second tether loop, wherein, when the protective cap is coupled to the mating end, access to the at least one conductor is restricted, and when the protective cap is removed from the mating end, access to the at least one conductor is allowed;
    wherein an arc length of the second tether loop is greater than a size of the protective cap such that the protective cap is able to pass through the second tether loop, and wherein an arc length of the first lanyard loop is large enough to allow the second lanyard loop to pass therethrough;

wherein the lanyard is secured to the tether by passing the second tether loop through the first lanyard loop and then passing the protective cap through the second tether loop.

18. The communication connector of claim 17, wherein the lanyard has cord with a first end and a second end, the second end being secured to the protective cap, the first end being looped to form the first lanyard loop, the first end being fixed to the cord by a fixing mechanism to fix an arc length of the first lanyard loop.

19. The communication connector of claim 17, wherein the tether has a cord with a first end looped to form the first tether loop and the second end looped to form the second tether loop, the first end being fixed to the cord by a fixing mechanism to fix an arc length of the first tether loop, the second end being fixed to the cord by the fixing mechanism to fix an arc length of the second tether loop.

20. The communication connector of claim 1, wherein the lanyard passes through the second tether loop and wherein the tether passes through the first lanyard loop such that pulling on the lanyard tightens the first lanyard loop around the tether and pulling on the tether tightens the second tether loop around the lanyard.

\* \* \* \* \*